Nov. 17, 1970    M. ZEMBA    3,540,143
HOOK-EQUIPPED LEADER STORING DEVICE
Filed Feb. 26, 1969
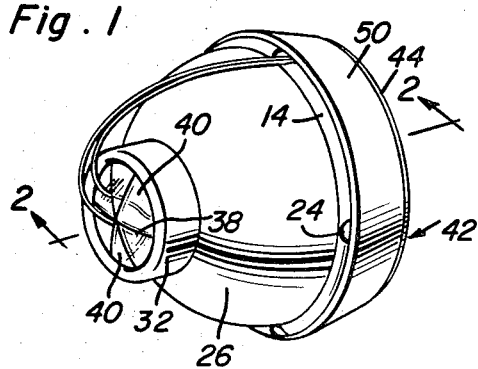
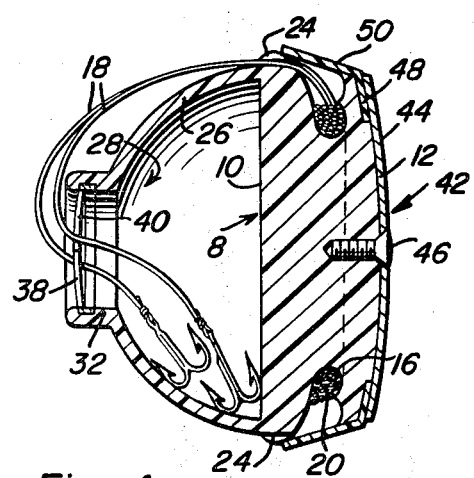
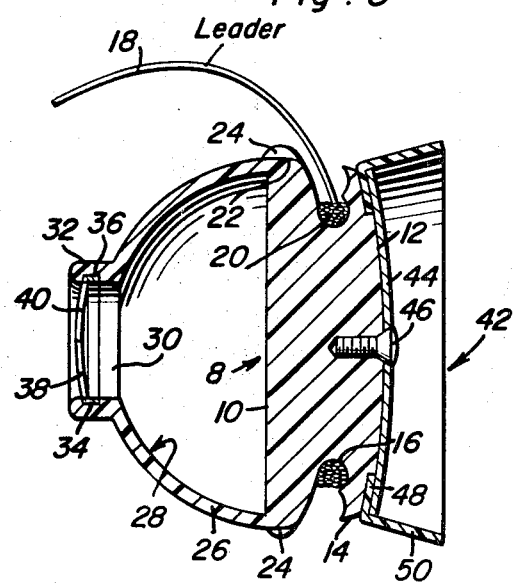
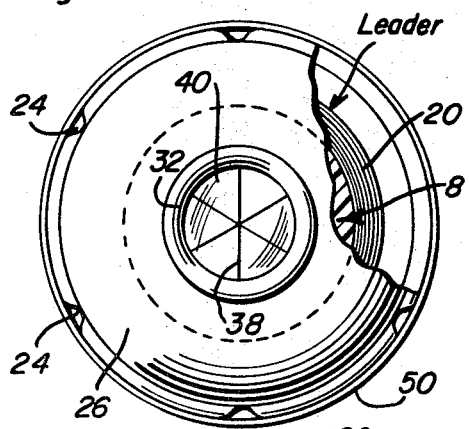
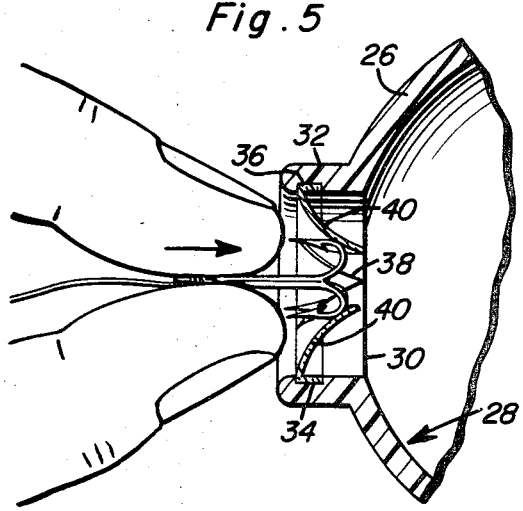
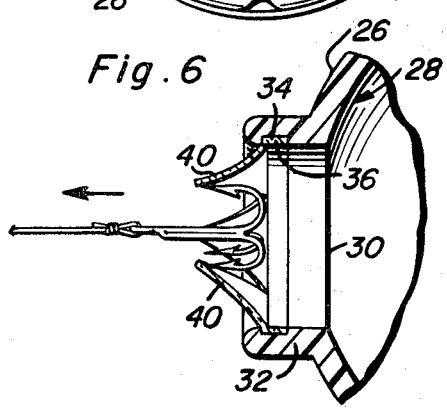
Michael Zemba
INVENTOR.
BY *Clarence A. O'Brien
and Harvey B. Jackson*
Attorneys

United States Patent Office 3,540,143
Patented Nov. 17, 1970

3,540,143
HOOK-EQUIPPED LEADER STORING DEVICE
Michael Zemba, 9207 Lomita Drive,
Alta Loma, Calif. 91701
Filed Feb. 26, 1969, Ser. No. 802,375
Int. Cl. A01k 97/06
U.S. Cl. 43—57.5         3 Claims

ABSTRACT OF THE DISCLOSURE

A hook-equipped leader storing and protecting device, comprising a spool having an encircling groove in which the leader is coiled and retained in place by a readily openable and closable elastic groove covering flange. The front side of the spool is provided with a bulbous-shaped clear plastic container whose hollow portion provides a receptacle in which the free hook-equipped end of each leader is protectively stored. The entrance opening of the container is provided with a unique neck.

---

This invention relates to significantly new and useful improvements in a simple, practical and highly efficient hook-equipped leader storing device which is characterized, broadly stated, by a leader coiling spool provided on a front side with a novel container and on a rear side by a cap-like unit which has a lip-like elastic flange which normally covers a grooved peripheral surface of the spool and which can be gripped with one's fingers and peeled back to a position which uncovers the coiled leader.

By way of introduction, it may well be pointed out that matters pertaining to shape, size and materials may vary in actual practice keeping in mind that the device, also designated as a leader tender and protector, may be ample and large enough for salt water leaders, small enough to obviate the necessity of disconnecting the leader from a rod-supported fishline, or of a size between the above-stated embodiments.

Briefly the device comprises a buoyant spool having disk-like front and rear sides and an endless peripheral surface. This peripheral surface is encompassed by an encircling groove or channel in which a fishing line leader can be compactly coiled and temporarily retained when not in use. A bulbous container is integrally joined with and opposed to the front side of the spool. More specifically, the container is a hollow hemispherical shell or enclosure, the hollow portion of which defines a chamber or receptacle in which a hook-equipped end portion of a leader can be inserted, enclosed and temporarily protectively stored for ready use. The outer end or crown portion of the container is provided with an exit-entrance opening and an integral outstanding complemental neck which is aligned with the opening and has a mouth portion which is normally closed by pressure-responsive closure means. This means, more specifically stated, comprises a plastic or an equivalent diaphragm of requisite pliancy, said diaphragm being provided with a plurality of circumferentially spaced slits. These slits define triangulate flaps and the flaps in turn provide the closure means. The flaps permit the hooks to be pushed through the neck and protectively confined in the receptacle portion or yanked out for use during which time the flaps flex and permit unobstructed hook inserting and removing steps to be accomplished. The rear side of the spool is provided with a two-part cap which embodies, as a portion thereof, a pliant or elastic lip. The lip in turn provides a flange and the flange hugs and surrounds the spool and covers the groove. The elasticity of the flange is such that it can be peeled to assume an open position to facilitate winding or coiling the leader. When the lip is closed it prevents uncoiling of the windings.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of a hook-equipped leader storing and protetcting device constructed in accordance with the principles of the present invention and showing the covering flange of the aforementioned composite cap closed an also the pliant closure means for the neck closed.

FIG. 2 is a view on an enlarged scale and primarily in section and taken on the plane of the section line 2—2 of FIG. 1.

FIG. 3 is a view similar to FIG. 2 with the lip flange of the cap means pressed out to and retained in an open position and showing a fragmentary portion of a leader.

FIG. 4 is a front elevational view with portions broken away and appearing in elevation and section.

FIG. 5 is an enlarged fragmentary detail section showing how the fisherman goes about pressing a multiple prong hook against the pliant closing flaps with a view towards enclosing and storing the hook; and FIG. 6 is a view similar to FIG. 5 but showing the hook being withdrawn and with the flaps flexed or pulled outwardly to expedite the withdrawal step.

Broadly, the overall adaptation is characterized by a marginally grooved leader winding spool, a container integral with and attached to a front side and a two-part or composite cap-like unit attached to the rear side of the spool.

With respect now to the spool it is denoted by the numeral 8 and is made of buoyant material and is of requisite diameter and because it is made of buoyant material it will cause the overall device to float in case it is accidentally dropped overboard. The flat disk-like front side of the spool is denoted at 10 (FIGS. 2 and 3) and the slightly convex rearward side or surface is denoted at 12. The marginal or peripheral surface is designated at 14 and it is provided with an encircling groove of requisite depth and suitable cross-sectional shape and which is denoted at 16. This groove serves to permit portions of the leader 18 to be coiled or wound therein. The wound portions are designated in nested or coiled position as at 20 in FIGS. 2, 3 and 4. That portion 22 of the peripheral surface appearing best in FIGS. 2 and 3 is provided with circumferentially spaced clearance notches 24 to facilitate bending and flexing the leader (or leaders) and to assist in keeping the same in an orderly manner. The integral companion hollow hemispherical or bulbous-shaped container is denoted by the numeral 26 and is preferably made of moldable clear transparent material. It is of a shape and size so that the hollow portion 28 provides a chamber or receptacle for the hook-equipped ends of the leaders, as shown for example in FIG. 2. The crown or outer central portion of the container is provided with a suitable entrance-exit opening 30. Extending outwardly from the outer surface and registering with the opening is a suitable ring-like neck 32 having an internal groove 34 to accommodate an attaching flange 36 on a plastic diaphragm. This diaphragm provides pressure-responsive closure means for the mouth of the neck. More specifically, the diaphragm is provided with circumferentially spaced radial slits 38 defining a plurality of triangulate openable and closable flaps 40 which can be pressed-in in the manner shown in FIG. 5 when a hook is forced against the same or can be pulled out and opened up to assume the outwardly flaring positions shown in FIG. 6 when the hook is withdrawn.

The aforementioned composite or two-part rubber or equivalent cap is denoted by the numeral 42. Manifestly this cap could be of one-piece construction. Practice has shown that it is more desirable to use a concavo-convex attaching member 44 which is screwed or fastened in place as at 46 on the surface 12. This portion 44 corresponds in diameter with the surface 12. The edge portion is such that it overlaps and retains in place an anchoring flange 48 which positions the lip-like flange 50 in a position so that it can be peeled from the position shown in FIG. 1 to that shown in FIG. 3 or can be permitted to snap back in place under which circumstances the flange overlies and covers the groove and presents the windings of the leader from uncoiling.

At least four and perhaps six keeper notches 24 can be provided to permit the user to employ more than one hook-equipped leader and to separate the leaders one from the other for expeditious use in handling. In this connection it will be noted that the width of the lip-like flange 50 is such that when it is closed as brought out in FIGS. 1 and 2 an edge portion of the lip actually covers, or partly so, the keeper notches 24.

As is seemingly evident a leader storing device of the type shown and described lends itself to practical use when the angler desires to store a single leader and a single or multiple prong hook on the free end thereof. It is also within the purview of the invention to wind and store a plurality of hook-equipped leaders. Two such leaders are shown for example in FIG. 2.

With respect to the aforementioned cap 42 on the surface 12, this can be made from a single molded unit or from the component parts 44 and 50 as shown and described. In any event, the elasticity of the lip-like flange 50 should be such that it tightly hugs and covers the coiling groove 16. It should be also of a degree of elasticity that it can be manipulated with one's fingers to "peel" it from the position shown in FIGS. 1 and 2 to the uncovered position shown in FIG. 3. It can be readily snapped back in place to assume its normal groove-closing position.

By employing a suitably tensioned pliant plastic or equivalent diaphragm closure means, characterized by the triangulate flaps 40, permits one to press the hooks through the neck and opening or to, alternatively, withdraw the same as illustrated in FIG. 6.

The foregoing is considered as illustrative only of the principles of the invention. Further, since numerous modifications and changes will readily occur to those skilled in the art, it is not desired to limit the invention to the exact construction and operation shown and described.

What is claimed as new is as follows:

1. A fisherman's leader and fishhook storing device comprising a hollow container, the hollow portion of said container constituting a receptacle in which at least one fishhook on the free end of a leader can be inserted, enclosed and stored in readiness for use whenever necessary or desired, said container being hemispherical in shape and made of clear plastic material and having a first side provided with an entrance opening by way of which a hook can be manually inserted and subsequently removed, and a second side provided with a leader coiling spool, said spool being made of buoyant material and having a peripheral surface provided with a leader coiling and nesting groove, said first side having an outstanding readily accessible annular neck aligned with said entrance opening and also provided with a disk-like diaphragm spanning the inlet mouth portion of said neck, said diaphragm being radially and circumferentially slitted and the resultant slits providing complemental flaps, said flaps being bendably pliant and interrelated and providing normally closed pressure openable closure means, said flaps capable of being forcibly pushed and flexed inwardly and subsequently pulled and drawn outwardly depending on whether a hook is being inserted or withdrawn, leader retaining means attached to and carried by said spool, said means embodying an endless annular groove-covering-flange, said flange being elastic and normally encompassing the grooved peripheral surface but capable of being manually gripped, flexed and flipped to an out-of-the-way groove uncovering position at will.

2. A fisherman's leader and attached hook storing drevice comprising a spool having front and rear sides, respectively, and an endless peripheral surface surrounded by an encircling groove in which a fishing leader can be neatly coiled and compactly nested when not being used, a hollow hemispherical container opposed to and aligned with and having an inner end joined with said front side, the hollow portion of said container and said front side conjointly providing a receptacle in which the hook-equipped end portion of a leader can be inserted, enclosed and temporarily protectively stored for ready use, the outer convex end of said container having a centralized exit-entrance opening and an aligned outstanding complemental annular neck, the mouth of said neck having normally closed pressure openable closure means comprising a diaphragm spanning the mouth of the neck and having a marginal edge portion anchored in a groove provided on the interior of the neck, said diaphragm being radially slitted and the resulting coacting slits providing a plurality of complemental flaps, said flaps being pliant and cooperatively interrelated and being normally in mouth-closing relationship, said flaps capable of being pushed in and flexed or pulled out and flared outwardly depending on whether a hook is being inserted or withdrawn, the rear side of said spool being provided with cap means embodying an endless elastic flange, said flange snugly and retentively encircling said peripheral surface and normally covering the groove.

3. The fisherman's leader and hook storing device defined in claim 2, and wherein said cap means is centrally detachably mounted on said rear side, said flange being of a width equal to the width of said peripheral surface and having a free marginal edge which yieldingly grips said surface but can be caught hold of with the user's fingers, whereby it can be flexed and flipped to assume a groove exposing position at will.

References Cited

UNITED STATES PATENTS

| | | | |
|---|---|---|---|
| 2,051,068 | 8/1936 | Ayre et al. | 211—16 |
| 2,559,780 | 7/1951 | Martinson | 43—57.5 X |
| 3,062,475 | 11/1962 | Miller | 242—85.1 |
| 3,302,320 | 2/1967 | Breeden | 43—54.5 X |

WARNER H. CAMP, Primary Examiner